(No Model.)
E. A. & M. H. DAVIS.
FORK FOR HAY TEDDERS.
No. 540,255. Patented June 11, 1895.
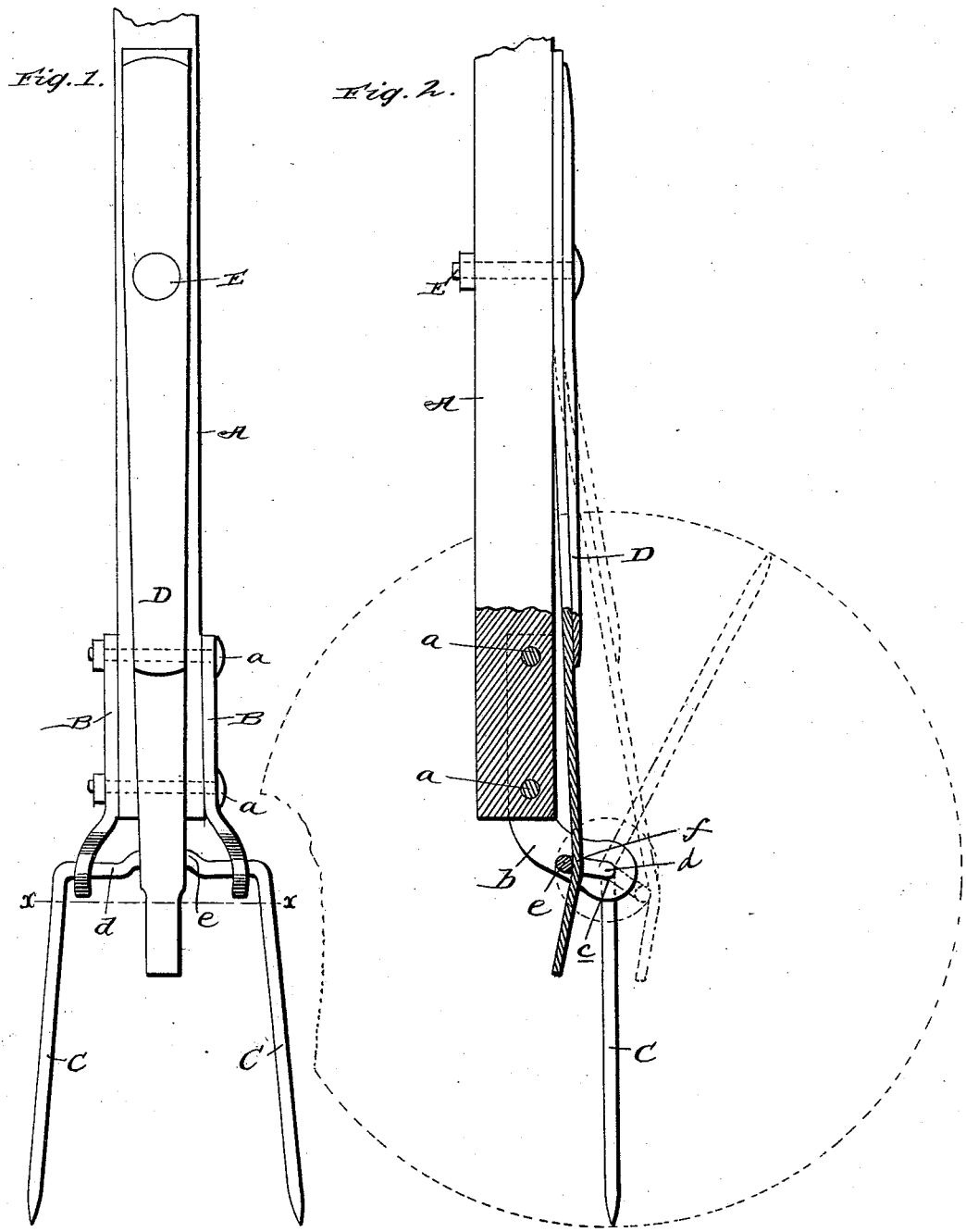

UNITED STATES PATENT OFFICE.

ERNEST A. DAVIS AND MENNO H. DAVIS, OF ALBION, MICHIGAN.

FORK FOR HAY-TEDDERS.

SPECIFICATION forming part of Letters Patent No. 540,955, dated June 11, 1895.

Application filed March 23, 1895. Serial No. 542,950. (No model.)

*To all whom it may concern:*

Be it known that we, ERNEST A. DAVIS and MENNO H. DAVIS, citizens of the United States, residing at Albion, in the county of Calhoun and State of Michigan, have invented certain new and useful Improvements in Forks for Hay-Tedders; and we do declare the following to be a full, clear, and exact description of the invention, such as will enable others skilled in the art to which it appertains to make and use the same.

This invention has relation to improvements in forks for hay tedders, and it has for its prime object to provide a fork which will readily adjust itself after meeting an obstruction, without any care or attention from the operator, or driver, and one which cannot be broken or injured or any of the parts become strained or disarranged when the teeth encounter stones, stumps, or other hard substances.

Hay tedders as heretofore constructed, have employed forks made with double teeth or tines connected by a crank portion journaled in the holder bar or arm, and a spring has been used for holding the teeth in an operative position; the spring having a hook to engage the crank portion of the teeth so as to limit the swinging movement of the latter. These have been found very objectionable, as the teeth are in some cases brought against an obstruction with such violence as to break or strain the spring and sometimes injure the teeth. By our improvements these objections are overcome, and a construction employed at a comparatively small expense, which will permit of an automatic adjustment of the teeth or tines so as to always bring the teeth into an operative position after passing the obstruction.

The invention will be fully understood from the following description and claim, when taken in connection with the annexed drawings, in which—

Figure 1 is a face view of our improvements with the holder-bar partly broken away. Fig. 2 is a side elevation of the same, partly in section; and Fig. 3 is a cross-sectional view taken in the plane indicated by the dotted line $x\ x$ on Fig. 1.

Referring by letter to said drawings, A, indicates the arm or holder bar which may be of the material and form usually employed. On the lower end of this holder bar and on opposite sides thereof, are secured two plates or castings B. These castings which are secured to said bar by means of bolts $a$, and nuts or other suitable fastening devices, have their lower ends curved outwardly in opposite directions, as shown, and thence curved rearwardly as at $b$, and they are provided at suitable points in the curved portions, with journal holes or apertures $c$, in which the teeth or tines are supported.

C, indicates the teeth which are constructed in pairs from a single piece of material. These teeth are preferably formed from steel wire and are made by bending a piece of sufficient length midway thereof, forming branches $d$, at about right angles to the tines or teeth C, and the connecting angular portion is bent oblique or approximately at right angles to the portions $d$, as shown at $e$. It will be observed that the cranked or angular portion $e$, is not at right angles to the plane of the teeth C, as for good practical results it is preferable to have such portion in a plane oblique to said teeth, although in some cases, said cranked or angular portion may assume a position relatively at right angles to the plane of the teeth. The portions $d$, are journaled in the castings B, so that the teeth may make either a partial or a complete revolution in their bearings.

D indicates a spring which is here shown as a leaf-spring, although a single spring might be used. This spring is secured to the rear side of the holder bar by a bolt E, and nut or other suitable fastening device, and its lower end bears upon the cranked connection of the tines or forks. This spring passes between the curved portions of the casting B, and is preferably formed with a slight bend $f$, where it normally presses against said crank portion of the fork. This spring is of a sufficient length and is free from hooks or stops so that the forks may hold contact therewith while making a complete revolution or a partial revolution in their bearings, and it matters not how forcible the teeth will be brought into contact with an obstruction, they will never be strained or broken as the spring will allow them to give and if they are thrown upwardly beyond a certain point, the spring will force them around and downwardly to an operative position. If they meet with less resistance they will not make a complete revolution but will be thrown down in an opposite direction from whence they were moved by the action of the spring.

Having described our invention, what we claim is—

The combination with a holder bar; of the castings secured to the lower end thereof, the teeth or tines journaled therein and connected by the cranked portion, and a spring secured to the holder bar at one end and bearing at its opposite end upon the crank portion so as to allow the teeth to make a revolution in their bearings, substantially as specified.

In testimony whereof we affix our signatures in presence of two witnesses.

ERNEST A. DAVIS.
MENNO H. DAVIS.

Witnesses:
HENRY D. SMITH,
W. A. HAMILTON.